TRANSISTORIZED GENERATOR OF TELEPHONE RINGING CURRENT
Filed May 7, 1958
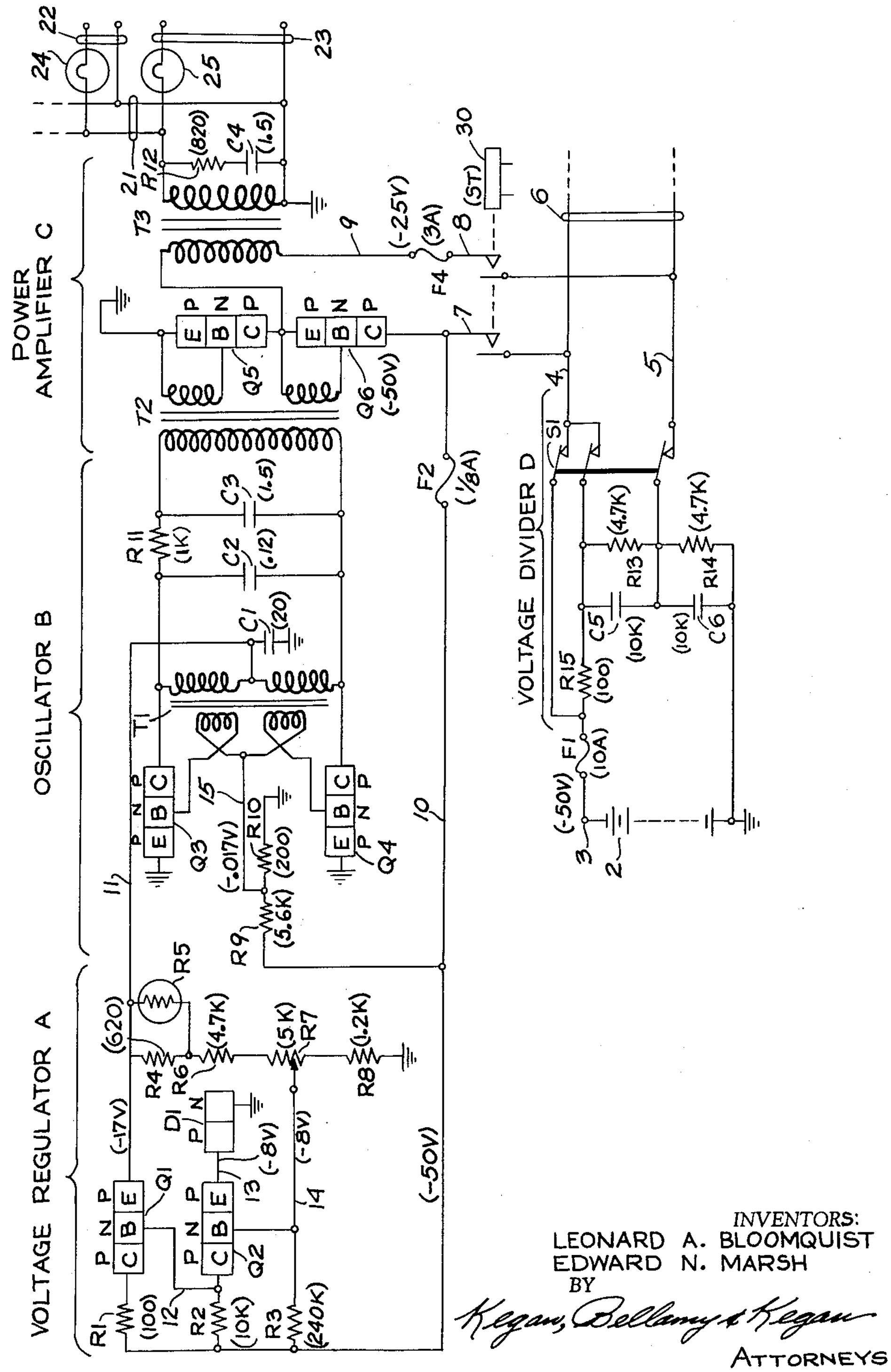
INVENTORS:
LEONARD A. BLOOMQUIST
EDWARD N. MARSH
BY
Kegan, Bellamy & Kegan
ATTORNEYS 3,056,931

TRANSISTORIZED GENERATOR OF TELEPHONE RINGING CURRENT

Leonard A. Bloomquist, Chicago, and Edward N. Marsh, Oak Lawn, Ill., assignors to International Telephone and Telegraph Corporation, New York, N.Y., a corporation of Maryland Filed May 7, 1958, Ser. No. 733,518
5 Claims. (Cl. 331—111)

This invention relates to a transistorized generator of telephone ringing current. The main object is to provide a simple, reliable, and efficient circuit arrangement employing transistors powered by the usual exchange battery, or similar direct-current supply, in a telephone system for supplying ringing current to operate the ringers at called telephones.

A further object is to provide a circuit organization of the foregoing character which is readily adjustable to a precise desired frequency and which is sufficiently stable in frequency that it serves satisfactorily in frequency-selective party-line telephone systems.

Generally similar generators of telephone ringing current which employ vacuum tubes have been used successfully, as is disclosed in the co-pending application of G. H. Brodie and A. J. Radcliffe, Jr. for an Electronic Generator of Telephone Ringing Current, Serial No. 721,022, filed March 12, 1958, Patent No. 2,991,428, as a continuation-in-part of their earlier application, Serial No. 305,048, filed August 18, 1952, now abandoned. While generally satisfactory, these prior generators of ringing current consume heater current during idle ringing periods in order that the vacuum-tube apparatus be ready to function when a ringing demand is made; moreover, a separate high-voltage source of power is required since the usual exchange battery (having a potential of 48 or 50 volts) has insufficient voltage for the vacuum tubes used.

According to the invention, commercially obtainable transistors are used in the ringing generator having supply-voltage requirements less than the voltage of the usual exchange battery, whereby no separate source of power is required. All current supply can be maintained normally disconnected from the generating apparatus, and is applied only as ringing current is needed, whereupon the ringing current becomes immediately available since transistors require no warm-up time.

A further feature of the disclosed circuit arrangement is that the desired frequency and wave form of the generated ringing current is controlled from a voltage-sensitive transistor oscillator by supplying thereto a regulated partial voltage from the exchange battery, with means for adjusting the regulated voltage according to the output frequency desired.

A still further feature resides in a push-pull output stage across which the full voltage of the exchange battery is impressed, along with a center tap of the exchange battery so connected to the transistors of the output stage that the effective working voltage of each is half the voltage of the exchange battery. A related feature of the noted arrangement is that a derived, rather than actual, center tap of the exchange battery is employed thus giving equal voltage to the two halves of the output amplifier despite the usual practice of including and excluding end cells or counter cells.

According to a further feature, while the noted oscillator inherently generates a substantially square-wave output for controlling the power amplifier, the output from the oscillator is modified before delivery to the power amplifier by an isolating filter arrangement which provides slightly rounded corners to the wave form reaching the power amplifier, but without substantial adverse effect on the oscillator.

The above-mentioned and other features and objects of this invention and the manner of attaining them will become more apparent, and the invention itself will be best understood, by reference to the following description of an embodiment of the invention taken in conjunction with the accompanying drawing, comprising a single sheet.

Referring to the drawing, the circuit arrangement is shown in full for a voltage generator comprising voltage regulator A, oscillator B, and power amplifier C. This generator, when set in operation by the energization of start relay 30 (controlled in known manner from the telephone switchboard) supplies ringing current to switchboard conductors 21 and over their branches such as 22 and 23, by way of so-called generator lamps 24 and 25, one for each such branch.

Voltage divider D is common to the illustrated ringing generator and to as many other similar generators as required, all such generators being supplied with full-voltage and half-voltage current over conductors 4 and 5, which are multipled at 6 to the other generators (not shown).

The usual exchange battery or other source of direct current is indicated at 2. The positive pole of this battery is unfused and grounded as indicated, while the negative pole 3 of the battery 2 (indicated as of negative 50 volts with respect to ground) is fused at F1, as by a 10-ampere fuse.

Voltage divider D comprises essentially a pair of similar resistors R13 and R14, shunted by high-capacity electrolytic condensers C5 and C6, each of which may have a capacity of 10,000 microfarads, as is indicated by the parenthetical notation (10K). Resistors R13, R14 may each have a value of 4,700 ohms, as indicated by the accompanying notation (4.7K).

When the voltage divider is first to be connected with the battery 2, by fuse F1, the 3-pole switch S1 is open, wherefore the large surge current which would otherwise flow initially into condensers C5 and C6 is limited by the 100-ohm resistor R15. A short time later, switch S1 is closed to connect the output of the voltage divider to conductors 4 and 5 and to shunt the resistor R15 out of the operating path from 3 to 4. It will be understood, of course, that the grounded terminal of the battery 2 is also wire-connected to the illustrated ringing current generator and to the other similar ones, as is indicated by the ground symbols in the illustrated generator.

The two similar resistors R13 and R14 act as a voltage divider which impresses upon the junction of condensers C5 and C6 (and on conductor 5 when S1 is closed) one-half the voltage to ground of negative terminal 3 of battery 2. The center point of the two supply condensers remains at that fixed intermediate direct-current voltage despite the demands of the power amplifier C since these demands are substantially balanced in wave form and are essentially alternating-current demands.

When start relay 30 operates, conductor 4 is connected to conductor 7, thereby supplying thereto a negative potential of 50 volts with respect to ground (assuming terminal 3 of battery 2 to be at negative 50 volts), and 50 volts is also supplied through fuse F2 (⅛ ampere) and conductor 10 to voltage regulator A and oscillator B. At the same time, conductor 5 is extended to conductor 8 to supply negative 25-volt current through the 3-ampere fuse F4, and conductor 9 to power amplifier C. Power amplifier C thus has a 50-volt negative supply over conductor 7, a 25-volts negative supply over conductor 9, and a positive supply at ground connected to the upper terminal of transistor G5, whereby the power amplifier C is powered to respond to input current from oscillator B to generate alternating current through tranformer T3 for supply to conductors 21.

The disclosed generator employs transistors Q1 to Q6, each of which is indicated as being of the germaniumjunction type and of P,N,P polarity, and each of them is marked internally with E, B, and C representative respectively of emitter, base, and collector electrodes. For a 35-watt output the transistors employed may be those commercially available under the following indicated code numbers:

| | |
|---|---|
| Q1 | 2N268 or DT55. |
| Q2 | 2N187. |
| Q3 | 2N45. |
| Q4 | 2N45. |
| Q5 | 2N268 or DT55. |
| Q6 | 2N268 or DT55. |

For a 65-watt output transistors Q1 to Q4 are as above, with Q5 and Q6 each being a 2N174 or an H6.

At voltage regulator A, through current flows from the negative 50-volt supply on conductor 10, through 100-ohm resistor R1, and transistor Q1, and over the nominal 17-volt conductor 11 to oscillator B. The value of the voltage supplied to conductor 11 is determined by the response of Q1 to the voltage on its control conductor 12, supplied with current from conductor 10 by way of resistor R2. In turn, the value of the voltage on conductor 12 depends upon the response of transistor Q2 to voltage on its control conductor 14, obtained in small part from conductor 10 through the 250,000-ohm resistor R3, but primarily from the slide arm of resistor R7, which is connected in the illustrated bleeder network (resistors R4 to R8) between conductor 11 and ground. The effect which voltage on control conductor 12 has at Q2 is controlled by the 8-volt Zener-voltage drop across the inversely connected diode D1, which provides a fixed reference voltage of negative 8 volts on conductor 13. The potential drop between the emitter and base of Q2 is so slight that the potential on conductor 14 is only slightly in excess of negative 8 volts. Any tendency for the voltage on 14 to increase causes additional current to flow through the emitter portion of Q2 to ground through DI, causing the collector portion of Q2 to carry additional current. Thereby the negative potential on conductor 12 is reduced, decreasing collector current at Q1 to lower the voltage on conductor 11. A tendency for the voltage on conductor 14 to decrease causes the opposite response. The flow through R3 additionally compensates for voltage changes on conductor 10.

If a somewhat higher regulated voltage is desired on conductor 11, as to overcome manufacturing variations in the components to thereby cause the oscillator B to increase its frequency to the desired value, the slide arm of resistor R7 is moved downwardly to a lower voltage point on the illustrated bleeder network, causing Q2 and Q1 to interact to provide a higher voltage (up to 20 volts, for example) on conductor 11. Conversely, raising the slider on R7 from its illustrated position similarly lowers the voltage on conductor 11, as to 15 volts, for example.

Resistors R5 comprises a thermistor. Its resistance decreases with a rise in temperature. It is shunted around resistor R4 to stabilize the apparatus with respect to changes in the ambient temperature, to the end that the potential to ground supplied on conductor 11 is substantially independent of temperature over a considerable range above and below nominal room temperature.

Referring to oscillator B, the emitters of Q3 and Q4 are grounded; the collectors are supplied with negative potential from conductor 11 by way of the primary windings of transformer T1; and the base elements of Q3 and Q4 are supplied with a very low negative starting potential (about .017 volt) over conductor 15, obtained from the 50-volt conductor 10 through the junction of bleeder resistors R9 and R10. The flow from 15 is by way of the secondary windings of T1 to ground through the emitter elements of Q3 and Q4.

The indicated iron core of transformer T1 is preferably composed of nickel iron or a similar alloy having a rectangular hysteresis loop, which is desirable for close frequency regulation.

When conductor 10 is energized by the noted operation of relay 30, thereby energizing conductor 11 as noted, a small emitter current to ground is drawn by Q3 and Q4 over conductor 15, causing the collector components of Q3 and Q4 to both start to conduct and thus draw current to ground from conductor 11 through both primary windings of T1. To the extent that Q3 and Q4 conduct precisely equally, the current through the primary windings of T1 has no effect on the control current flowing through the secondary windings from conductor 15, but one transistor invariably starts to conduct slightly more current than the other. If, for example, Q3 starts to conduct slightly more current than Q4 does, the excess current conducted by Q3 magnetizes the core of T1 accordingly, causing the bias current drawn by Q3 through its associated secondary winding of T1 to increase, thus increasing the conductivity of Q3. At the same time the inductive action is reverse with respect to the bias current at Q4, terminating the bias current at Q4. As a result, the current suddenly stops at Q4 and rises abruptly to full value through Q3.

The full-value flow of current through the collector base and emitter electrodes of Q3 in series continues (accompanied by the flow of substantially zero current through the corresponding path of Q4) for the length of time required to saturate the nickel-iron core of T1. When saturation occurs, the induced current in the secondary windings of T1 abruptly ceases, permitting Q4 to start to conduct. The conductivity of Q3 responsively drops sharply because of the loss of forward induced potential at the associated secondary winding of T1. These two actions combine to induce current in the lower left-hand winding of T1 to flow through the base electrode of Q4 to ground through the emitter electrode, thereby reinforcing the conductivity of Q4. The resulting oppositely directed potential in the upper left-hand winding of T1 causes conductivity to cease abruptly at Q3 coincidentally with starting abruptly at Q4.

Q4 remains at full conductivity, and Q3 remains at substantially zero conductivity, until the core of T1 becomes demagnetized and is remagnetized in the opposite direction to the point of saturation, whereupon the action shifts again, with conduction suddenly ceasing at Q4 and suddenly resuming at Q3.

When either of the transistors Q3 and Q4 is conducting, its collector electrode is maintained at a potential approximating ground potential, and the collector electrode of the other transistor is maintained at substantially the potential of supply conductor 11, the potentials at the two collector electrodes reversing abruptly each time the stated conductivity shifts from one transistor to the other. Consequently, an alternating-current potential is developed across the collector electrodes of transistors Q3 and Q4 to supply a driving potential to the primary winding of transformer T2 of the power amplifier. The small condenser C2 shunted across the collectors of Q3 and Q4 has sufficient capacity to prevent the oscillator from tending to oscillate at some higher frequency controlled according to the combination of inductance and distributed capacity of T1 but has but little effect on the substantially square wave form of the potential across the collectors of Q3 and Q4. On the other hand, condenser C3 (at 1.5 microfarads capacity) across the primary winding of T2 acts to round somewhat the corners of the otherwise square wave form delivered to transformer T2, thus reducing the transient effect and consequent harmonics at the power amplifier. The 1,000-ohm resistor R11 sufficiently isolates transformer T2 from transformer T1 and the collector elements of the oscillator transistors Q3 and Q4 to prevent condenser C3 from having an adverse effect upon the described operation of the oscillator.

Referring to the power amplifier C, the lefthand, or primary winding of transformer T2 begins to receive the described modified square-wave input current immediately upon the described operation of start relay 30 to energize conductors 7 and 8. The consequent voltages induced in the secondary windings of transformer T2 cause the power transistors Q5 and Q6 to conduct alternately, on respective half waves of the alternating oscillator current. When either transistor Q5 or Q6 is caused to conduct (by current flow through its emitter and base electrodes from the associated secondary winding of T2) a reverse potential is applied to the other transistor, which blocks the flow of collector current therethrough.

When Q5 is conducting (and Q6 is blocked) current flows to ground from the negative 25-volt conductor 9, through the primary winding of output transformer T3 and the collector, base, and emitter electrodes of Q5 in series. During this time, the junction between transistors Q5 and Q6 is near ground potential, wherefore substantially the full 50-volt potential of conductor 7 is impressed across the non-conducting transistor Q6.

When, during the next half cycle of the oscillator current, transistor Q5 is blocked and transistor Q6 is rendered conducting, current flows from the negative 50-volt supply on conductor 7 through the collector, base, and emitter electrodes of Q6 in series, and thence through the primary winding of output transformer T3 to the negative 25-volt supply on conductor 9. During this time, the junction point between Q5 and Q6 is maintained at very nearly the negative 50-volt potential of conductor 7, wherefore substantially 50 volts is impressed across the non-conducting transistor Q5.

Since the current flows in opposite directions through the primary winding of output transformer T3, depending upon whether Q5 or Q6 is conducting, the core of T3 is magnetized in first one direction and then the other, thereby generating an alternating potential across the terminals of the secondary winding of T3 to which ringing-current supply conductors 21 are connected. The alternating potential thus impressed tends to have substantially the modified square-wave form described for the input to transformer T2, which is a satisfactory wave form for operating telephone ringers except for some tendency to cause excessive induction from the line receiving ringing current to adjacent lines. This tendency is relieved to a satisfactory extent by condenser C4 which is connected across conductors 21 in series with the 820-ohm resistor R12. C4 and R12 serve the further purpose of reducing the tendency of excessive self-induction voltages to reach and damage transistors Q5 and Q6 from the primary winding of transformer T3, as when conductivity of the transistor being brought into conduction is delayed (perhaps a microsecond or so) after the previously conducting transistor has been rendered substantially non-conducting.

During any half cycle of the output amplifier, the value of the current flow over conductor 9, through the primary winding of T3, depends on the load across output conductors 21, being very small at low load and increasing to a sizable value as a full load is applied across conductor 21. The 3-ampere fuse F4 is provided to protect transistors Q5 and Q6 from excessive current in the event of an overload on conductor 21.

When current is no longer needed for the moment over output conductors 21, start relay 30 may be deenergized, opening its contacts to disconnect conductors 4 and 5 from conductors 7 and 8, stopping current flow in regulator A, oscillator B, and power amplifier C.

Telephone ringing current which the disclosed generator is designed to supply is commonly at a frequency of 20 cycles per second for single-frequency installations. For multi-frequency party-line systems several frequencies (usually five) may be required ranging from perhaps 16 to perhaps 66 cycles per second. Accordingly, the illustrated generator may be used to supply one such frequency, with similar generators connected over supply conductors 6 being used to supply the other frequencies. Each such generator may be set at the slide arm of R7 to supply any frequency in a range in excess of the ratio of 3 to 4, such as from 15 to 21 cycles per second. Each such generator preferably employs a differently wound or differently strapped oscillator transformer T1, according to the frequency range desired.

While we have described above the principles of our invention in connection with specific apparatus, it is to be clearly understood that this description is made only by way of example and not as a limitation to the scope of our invention.

We claim:

1. Apparatus for generating alternating ringing current for a telephone system having a central battery for supplying direct current over two principal supply conductors extending from respective poles of the battery, said apparatus comprising an intermediate supply conductor and means for maintaining a substantially fixed intermediate potential thereon from the principal supply conductors despite heavy alternating negative and positive current demands over the intermediate conductor, such maintaining means comprising a separate resistor connecting each principal supply conductor to the intermediate supply conductor and a separate large-capacity condenser connecting each principal supply conductor to the intermediate supply conductor, an output transformer having a primary winding one terminal of which terminates the intermediate supply conductor, and control means for connecting the other terminal of the primary winding conductively to the principal supply conductors alternately at the desired frequency of the said alternating ringing current, direct current thereby flowing interruptedly in the principal supply conductors alternately, and a resulting alternating current thereby flowing in the said intermediate supply conductor in series with the said primary transformer winding, with each half cycle of such alternating current charging one said condenser and discharging the other but with negligible change in potential across the condensers.

2. Apparatus according to claim 1, wherein the said control means comprises a pair of power transistors serially connected between the said principal supply conductors, with the said other terminal of the said primary winding connected to the junction point of the transistors, the said control means further comprising means for rendering said transistors conductive alternately at the said desired frequency.

3. An alternating current generator having an output of modified square waveform, comprising a power amplifier having an output transformer including primary and secondary windings, a direct current power supply connected to one end of said primary winding, said power supply comprising a battery connected in parallel with a voltage divider, each arm of the voltage divider including the parallel combination of a resistor and large capacity condenser, the one end of said primary winding being connected to the middle of said voltage divider, and control means connected to the other end of said primary winding for supplying direct current of alternately changing polarity, said control means comprising a square wave oscillator having a capacitor effectively connected across the output thereof to round the corners of said square wave.

4. The generator of claim 3 and means comprising a resistor interposed between the output of said square wave oscillator and said capacitor to prevent said capacitor from effecting the action of the oscillator.

5. An alternating-current generator having an output of a rounded-corner generally square-wave form, comprising a power amplifier for supplying said output, the power amplifier having a pair of input terminals, a substantially square-wave oscillator having oscillator-output conductors connected respectively to said input terminals, a modifying condenser shunted across said input terminals of a capacity which is sufficient to somewhat round the corners of the generally square-wave form of said output, to thereby reduce the transient effect and consequent harmonics at the power amplifier and said output, said capacity being insufficient to materially distort the rounded-corner generally square-wave form of said output, and a resistor connected in series with one of said oscillator-output conductors and having a resistance high enough to prevent the modifying condenser from adversely affecting the action of the oscillator, the said resistance being low enough to avoid material distortion of the rounded corner generally square-wave form of said output.

References Cited in the file of this patent

UNITED STATES PATENTS

| | | |
|---|---|---|
| 2,352,299 | Walker | June 27, 1944 |
| 2,438,910 | Grieg | Apr. 6, 1948 |
| 2,772,370 | Bruce et al. | Nov. 27, 1956 |
| 2,797,261 | Polyzou | June 25, 1957 |
| 2,819,352 | Houck | Jan. 7, 1958 |
| 2,852,680 | Radcliffe | Sept. 16, 1958 |
| 2,861,237 | Zelina | Nov. 18, 1958 |
| 2,863,956 | Schmidt | Dec. 9, 1958 |
| 2,874,293 | McMurren | Feb. 17, 1959 |
| 2,901,557 | Hubbard | Aug. 25, 1959 |
| 2,964,652 | Yourke | Dec. 13, 1960 |
| 2,964,654 | Abraham | Dec. 13, 1960 |

FOREIGN PATENTS

| | | |
|---|---|---|
| 730,955 | Germany | Jan. 29, 1943 |
| 1,115,026 | France | Apr. 18, 1956 |